Nov. 3, 1959 H. J. VENEMA 2,911,595

RELAXATION OSCILLATORS AND CONTROL METHOD THEREFOR

Filed June 14, 1955 2 Sheets-Sheet 1

INVENTOR
HARRY J. VENEMA,

BY George V. Eltgroth

HIS ATTORNEY.

RELAXATION OSCILLATORS AND CONTROL METHOD THEREFOR

Filed June 14, 1955 2 Sheets-Sheet 2

INVENTOR:
HARRY J. VENEMA,

BY George V. Eltgroth
HIS ATTORNEY.

United States Patent Office 2,911,595

Patented Nov. 3, 1959

2,911,595

RELAXATION OSCILLATORS AND CONTROL METHOD THEREFOR

Harry J. Venema, North Syracuse, N.Y., assignor to General Electric Company, a corporation of New York

Application June 14, 1955, Serial No. 515,486

13 Claims. (Cl. 331—144)

My invention relates to electrical apparatus and, more specifically, to electronic relaxation oscillators. Still more specifically, my invention relates to electronic relaxation oscillators which are constructed in such a way that their output frequency is stable and their times of switching are substantially devoid of "jitter," or variation of period from one cycle to the next. In particular, this stability of frequency and of individual period length is obtained even for relatively low-frequency operation.

As is well known, relaxation oscillators, multi-vibrators for instance, operate between two states each of which is temporarily stable but each of which changes periodically by a rather sharp transition to the other state, only to return again to the first state, and so on. If the relaxation oscillator comprises two electronic tubes, with associated passive circuit elements, it is likely that a first one of the temporarily stable states is characterized by relatively high current in a first one of the electronic tubes and by no current or small current in the second one of the electronic tubes. Following a transition, or switching, to the second one of the temporarily stable states, the two electronic tubes will have interchanged their conduction states so that the first one of the tubes will be cut off or will be in a low-current state while the second one of the tubes will be carrying a relatively high current. The switching, or transition between states, occurs when a charge associated with a passive network connected to the control grid of the non-conducting tube dissipates itself to an extent sufficient to permit the potential on that control grid to rise above the cut-off voltage. When the potential of the control grid of the substantially non-conducting tube reaches that critical point so that conduction therein begins or suddenly increases, a regenerative action is initiated which does not end until the formerly non-conducting or low-current tube is fully conducting and the formerly conducting tube is substantially cut off. Inasmuch as the charge dissipation which governs the switching action usually takes place in accordance with an exponential law in which the critical grid potential is approached more and more gradually as the switching delay is increased, the times of switching for operation at comparatively low frequencies are not so sharply defined as at comparatively high frequencies of operation. Making this same statement in another way, if the grid voltage of the non-conducting tube in a given circuit is allowed to approach its critical value along an exponential curve in the time domain, a long period of time occupied by the exponential approach is likely to be accompanied by a very gradual intersection of the grid voltage curve with the critical voltage level. Inasmuch as the intersection is gradual, that is, inasmuch as the curve intersects the critical voltage level at a very acute angle, a slight change in the path of the curve or in the critical voltage level can cause considerable variation in time of switching. When this variation occurs more or less continuously from one cycle of operation to the next, it is known as "jitter" because a repetitive representation of the output waveform as portrayed on a cathode-ray oscilloscope will not be stationary at that part of the waveform which is the switching point.

In an effort to overcome this "jitter" or instability of switching times, relaxation oscillators have been designed in which the grid-leak resistors connected to the control grids of the respective tubes are returned to a high positive voltage rather than to ground, thus causing the control-grid voltage to approach exponentially a comparatively high voltage rather than a comparatively low voltage. Such a circuit design steepens the control portion of the exponential curve and causes the intersection of the curve with the critical voltage level to be less acute but, unfortunately, other things being equal, tends to increase the frequency of operation of the device. Moreover, especially for low-frequency operation, elimination of "jitter" may be incomplete. Thus, relaxation oscillators operating at a comparatively low frequency have generally been characterized by a low degree of stability of period length.

Accordingly, it is an object of my invention to provide a relaxation oscillator which is characterized by a stable frequency of oscillation.

It is a further object of my invention to provide a relaxation oscillator which can at the same time be characterized by a stable period of oscillation and also by a relatively long period of oscillation.

It is a specific object of my invention to provide a relaxation oscillator in which the curve describing the electric potential of the control element of the active device intersects the line characterizing the critical control-element-voltage level at an angle which approaches as nearly as possible a right angle, this condition being satisfied even though the period of oscillation may be relatively rather long.

Briefly, I have fulfilled the objects of my invention by employing in the switching time determining circuit a non-linear reactive element such as a saturable reactor or a non-linear capacitor. By employing such an element to influence the shape of the curve of control-grid voltage, I am able to obtain a curve which traverses the greater part of its time of rise toward the critical voltage at a rather slow rate (manifesting itself as a gently sloping line when grid voltage is plotted as a function of time), but which rather suddenly turns and approaches rapidly (as evidenced by a rather steep line) to the critical voltage at the instant of switching. By this means, I am able to have at the same time a relatively long period, if so desired, together with switching which is "crisp" and devoid of "jitter."

For additional objects and advantages, and for a better understanding of my invention, attention is now directed to the following description and the accompanying drawings. The features of the invention which are believed to be novel are particularly pointed out in the appended claims.

Figure 1:
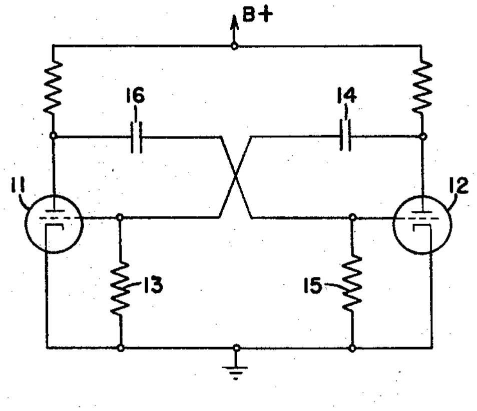
Figure 1 is a schematic circuit diagram of a prior-art relaxation oscillator.

Turning to Figure 1 of the drawings, a schematic diagram of a prior-art form of relaxation oscillator, specifically a free-running multivibrator, is presented. This circuit will be seen to comprise a simple two-stage resistance-capacitance-coupled amplifier in which the output of the second stage is fed back to the input of the first stage in such a way that the feedback is positive or regenerative, thus making oscillation possible. It will be noted that this circuit includes a tube 11 and a tube 12, each connected in series with conventional load resistors between ground and a supply of plate voltage. The grid of tube 11 is connected to ground through a grid-leak resistor 13 and to the plate of tube 12 through a coupling capacitor 14. The grid of tube 12, on the other hand, is connected to ground through a grid-leak resistor 15 and to the plate of tube 11 through a coupling capacitor 16. Now, as to the operation of the circuit, assume that by some means the grid of tube 11 is raised to such a potential that tube 11 begins to conduct. When conduction of tube 11 begins, the plate potential, of course, falls and, through capacitor 16, lowers the potential of the grid of tube 12 below the cut-off point. While tube 11 continues to conduct, with reasonably stable plate potential, and while tube 12 continues in a substantially cut-off state, the charge on capacitor 16 gradually dissipates through tube 11 and grid-leak resistor 15. This discharge follows an exponential path and continues until the potential at the grid of tube 12 rises to the critical cut-off level, at which time tube 12 begins to conduct, its plate potential falls rapidly, and through coupling capacitor 14, tube 11 is substantially cut-off. Thus, when the switching is complete, tubes 11 and 12 have exchanged their conduction states, and one-half cycle of oscillation is complete. The second half-cycle follows in an analogous manner, and the free-running oscillation continues without further excitation.

Figure 3:
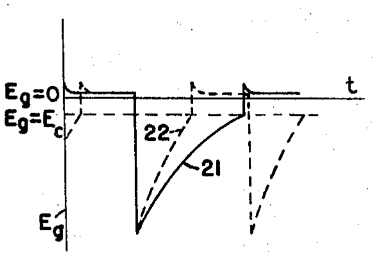
Figure 3 is a sample plot of grid voltage as a function of time for a prior-art relaxation oscillator both with and without an attempt at stabilization of switching time and frequency.

Now, as has been pointed out in the introductory paragraphs of this specification, a plot of the grid voltage of the non-conducting tube as a function of time approaches the critical cut-off level exponentially, and the approach becomes more gradual as the period of oscillation is increased. This exponential approach is portrayed by solid curve 21 in Figure 3. It will be noted that the portion of the curve near the reference numeral 21 has such a configuration as to approach asymptotically the line $E_g=0$, but that when the curve reaches the line $E_g=E_c$, the cut-off voltage, it is suddenly deflected upward to intersect the line $E_g=0$. This deflection occurs, of course, at the time the tube begins to conduct. It is to be emphasized that curve 21 intersects the line $E_g=E_c$ at a very acute angle, and that this acuteness of intersection, with its attendant uncertainty of intersection time, is a source of the "jitter" which the applicant's invention succeeds in substantially eliminating.

Figure 2:
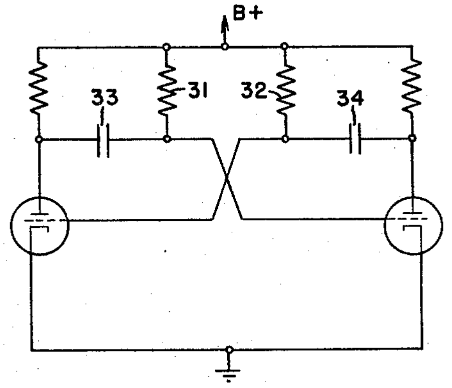
Figure 2 is a schematic circuit diagram of a prior-art relaxation oscillator in which an attempt at frequency stabilization has been made.

A prior-art method for reducing "jitter" is embodied in the circuit of Figure 2. It will be noted that the circuit of Figure 2 is similar to that of Figure 1, but that the circuit of Figure 2 possesses a grid-leak resistor 31 and a grid-leak resistor 32 which, instead of being connected to ground, are returned to the plate supply voltage. Thus, in the circuit of Figure 2, capacitor 33 and capacitor 34 discharge in such a way that the grid potentials $E_g$ of the non-conducting tubes approach asymptotically the voltage of the plate supply B+ rather than the ground voltage $E_g=0$. This mode of approach is illustrated by curve 22 of Figure 3, which shows that, as in the case of curve 21, the asymptotic approach is terminated at the point where the curve of $E_g$ intersects the line $E_g=E_c$ and is deflected vertically upward to $E_g=0$. It will be noted that the exponential part of curve 22 rises more rapidly than does the exponential part of curve 21 and that, hence, it intersects the line $E_g=E_c$ at an angle more nearly approaching a right angle. While this fact leads to the correct conclusion that the likelihood of jitter is reduced in the circuit of Figure 2 as compared with the circuit of Figure 1, the fact which requires most emphasis is that the period of oscillation represented by curve 22 is drastically shortened as compared with that represented by curve 21. Thus, in the prior-art apparatus, it is very difficult to have at the same time operation free of jitter, and oscillations of a comparatively long period. This difficulty is circumvented by the apparatus and method of my invention, which will now be described.

Figure 4:
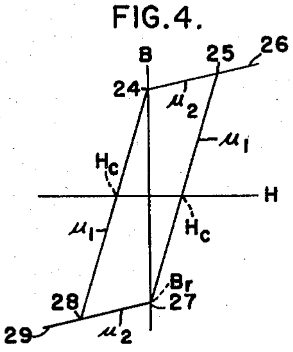
Figure 4 is a sample plot of flux density as a function of magnetizing force for a reactor core material suitable for use in a stabilization circuit of my invention.
Figure 5:
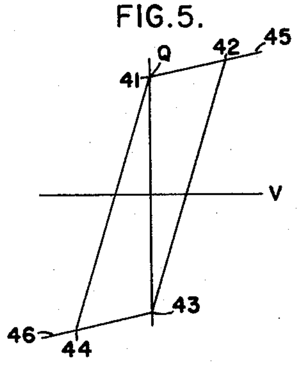
Figure 5 is a sample plot of charge as a function of voltage for a capacitor suitable for use in a stabilization circuit of my invention.

As has been briefly stated in the introductory paragraphs of this specification, I have found that the difficulties described supra can be solved by employing in the timing circuits of relaxation oscillators, properly connected non-linear reactive elements such as saturable-core inductors, and capacitors having a non-linear relationship between charge and voltage. A desirable type of characteristic for a core material to be employed in saturable reactors for this service is shown in Figure 4. Furthermore, a desirable type of characteristic for a capacitor to be employed in this service is shown in Figure 5. The display of Figure 4 is presented in the form of a so-called "B—H curve" because the quantities B (the magnetic flux density) and H (the magnetizing force per unit length) are commonly employed in the specification of magnetic materials. If desired, however, a similarly shaped plot might be made of flux or flux density as a function of magnetizing current for any given reactor. It will be noted that, in the B—H curve of Figure 4, the differential permeability of the material at any desired point is represented by the slope of the curve at that point. The inductance of the reactor at any given point is proportional to the slope of the curve at that point. It should be explained that the curve presented is exemplary only and might be considered to be only one of a family of "nest" or curves which characterize each suitable inductance core material. Further, the curve represents the magnetization path of a material as it undergoes a cyclical variation of magnetization in which the direction of magnetization is reversed twice per cycle. For iron or various members of the ferrites or other suitable core materials, the magnetization curve takes the form of a so-called "square loop" because of the sharp corners at angles approaching ninety degrees which occur at points 24, 25, 27 and 28. As the magnetizing force H increases from zero, in the cyclic progression, the permeability and inductance are at first relatively high while the curve is traversed from point 27 to point 25, at which time the permeability and inductance rather suddenly decrease and remain relatively low as the curve is traversed to point 26, which represents the point of peak magnetizing force H and flux density B. As magnetizing force is then decreased, the flux density falls relatively slowly, corresponding to relatively low values of permeability and inductance until the point 24 is reached, at which point, with further decreasing algebraic values of magnetizing force, the flux density begins to fall rapidly, corresponding to relatively high values of differential permeability and inductance. For core materials such as ferrites, which may be manufactured as described in Albers-Schoenberg, "Ferrites for Microwave Circuits and Digital Computers," Journal of Applied Physics, vol. 25, No. 2, February 1954, pages 152–154, or obtained from General Ceramic Co. (ferrite S–1), the "corner" points 24 and 27 may be made to fall substantially on the "B axis" (the line where magnetizing force H equals zero). The second half of the magnetization cycle is similar to the first half in that it represents essentially a curve obtained by successive reflections of the first half cycle in the B axis and the H axis. Thus, there are, another point 28 of rapidly changing permeability and inductance, still another point 29 of maximum absolute magnitude (negative in algebraic polarity) of magnetizing force and flux density, and finally a return path of comparatively low differential permeability and inductance to point 27 from which the cycle began.

Turning to the diagram of Figure 5, a curve is presented which is similar in its outlines to the "B—H" curve of Figure 4 but which represents charge as a function of impressed voltage for a type of non-linear capacitor suitable for use in certain configurations of my invention. The curve of Figure 5 might equally well be considered to represent a plot of electric polarization or displacement D as a function of electric gradient E applied to the dielectric material of the capacitor. The important thing to note is the fact that there are in the curve of Figure 5 four points 41, 42, 43, and 44, where comparatively sharp "corners" occur, and two points 45 and 46 which represent respectively the positive and negative maximum of charge and voltage. Inasmuch as the slope of the curve of Figure 5 is proportional to the permittivity of the dielectric material, it will be noted that the permittivity is relatively high between the points 42 and 43 on the curve, relatively low between points 41 and 45, relatively high between points 41 and 44, and relatively low between points 43 and 46. Thus an effect analogous to the saturation displayed in the curve of Figure 4 is present in the curve of Figure 5. Among the materials which display the type of characteristic pictured in Figure 5 is single-crystal barium titanate.

Figure 6:
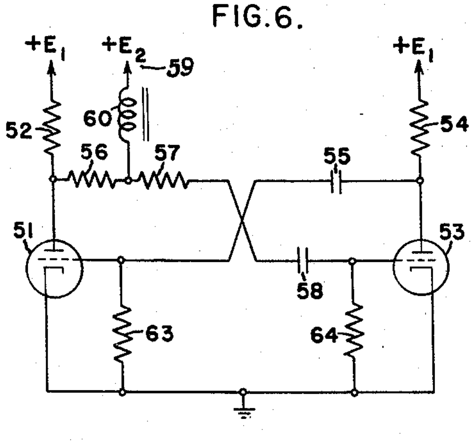
Figure 6 is a schematic circuit diagram of one configuration according to my invention.

Now that the essential characteristics of the non-linear reactive materials for this service have been set forth, I shall describe a first suggested embodiment of my invention, utilizing a non-linear inductor of the type characterized by the curve of Figure 4. The first suggested embodiment, as illustrated in Figure 6, is a relaxation oscillator somewhat resembling that of Figure 1 in its general outlines. However, the distinctions which characterize the circuit of Figure 6 will now be explained in detail.

In Figure 6, a tube 51 is connected through a plate load resistor 52 between ground and the plate voltage supply and, similarly, a tube 53 is connected through a plate load resistor 54 between ground and the plate voltage supply. The plate of tube 53 is connected through a capacitor 55 to the grid of tube 51, but the plate of tube 51, instead of being similarly connected to the grid of tube 53, is connected thereto through a resistor 56, a resistor 57, and a capacitor 58. It will be understood that the magnitudes of resistors 56 and 57 will depend upon the period and switching time desired for the relaxation oscillator.

Between the junction of resistors 56 and 57 and a source 59 of positive voltage there is connected a reactor 60 having a core possessing characteristics of the type illustrated in Figure 4. The source 59 is merely indicated in conventional manner in order to save space on the drawing. It will be understood that source 59 may comprise a battery, a rectifier, or any other suitable source of positive voltage, and that the negative terminal of source 59 is grounded or connected in some manner to the cathodes of tubes 51 and 53. Further, the magnitude $E_2$ of source 59 should be smaller than $E_1$, the magnitude of the plate supply for tubes 51 and 53. The respective tubes have grid-leak resistors 63 and 64 connected from their respective control grids to ground in a conventional manner. It will be noted that, since other means are provided for frequency stabilization and elimination of "jitter," these resistors may be returned to ground instead of to a positive voltage as was done in the circuit of Figure 2.

As for the operation of the embodiment of Figure 6 of my invention, the timing precision of the switching depends upon the saturation state of inductor 60, which as previously stated, may have a ferrite core of general ceramics material S–1, or any other reasonably equivalent material. If it is assumed that the circuit is initially in a temporarily stable state with tube 53 conducting and tube 51 cut off, there will be a steady flow of current from the plate-supply source of voltage $E_1$, through resistor 52, resistor 56, and inductor 60 to source 59 of voltage $E_2$. Since this current flow will be temporarily steady, with no rate of change, the potential at the junction of resistors 56 and 57 will be substantially $E_2$, if it is assumed that the resistance of inductor 60 is negligible. When, as has been explained, the charge on capacitor 55 decays to the extent that the potential of the grid of tube 51 can rise to the cut-off voltage, tube 51 begins to conduct appreciably. With the beginning of appreciable conduction in tube 51, the potential of the plate of that tube, of course, falls rapidly because of the voltage drop caused by the plate current flowing in resistor 52. The voltage $E_2$ of source 59 should be so chosen as to have a value intermediate between the plate supply voltage $E_1$ and the plate voltage itself during conduction of tube 51. Thus, when tube 51 begins to conduct, the plate voltage falls below the level $E_2$, and the current which is flowing from resistor 56 through inductor 60 to source 59 will have a tendency to reverse its direction of flow. However, this reversal cannot take place instantaneously in an inductor, and the current magnitude decreases at a finite rate as determined by, among other things, the inductance of inductor 60. Now, the voltage difference $(E_1-E_2)$, and the magnitudes of resistors 52 and 56 are so chosen that the magnitude of the current flowing in inductor 60, before the switching operation, is high enough to cause that inductor to operate on the relatively flat portion of the characteristic curve, i.e., for instance, the portion between points 25 and 26 as located in Figure 4. This portion of the curve, as has been stated supra, corresponds to saturation of the core and relatively low inductance. Therefore, following switching, the magnitude of the current decreases relatively rapidly until point 24 of the B—H characteristic is reached. At this point, however, the core becomes desaturated, and the inductance becomes relatively high, which means that, after the current in inductor 60 barely begins to flow in a direction toward resistor 56 instead of toward source 59, the rate of change of the absolute magnitude of the current is relatively low. Since resistor 56 has a high value, the high value of inductance of inductor 60 means that the charge on capacitor 58, which holds the grid of tube 53 below cutoff, can leak off only very slowly. This slow rate of discharge of capacitor 58 continues as long as inductor 60 remains in its high-inductance condition, that is, until the magnitude of the reverse-polarity current in inductor 60 builds up to such an extent that the B—H curve is traversed from point 24 to point 28. When point 28 is reached, so that the inductance of inductor 60 is suddenly lowered, not only does the decay of charge on capacitor 58 become facilitated, but also the voltage drop across inductor 60 suddenly decreases, as a result of which the potential of the junction between resistors 56 and 57 suddenly increases. The combined effect of the decay of charge on capacitor 58, together with the sudden rise of potential at the junction of resistors 56 and 57, is a sudden rise of potential at the grid of tube 53. When the potential at the grid of tube 53 experiences the sudden rise, it rather quickly reaches the cutoff level $E_c$, at which time tube 53 begins to conduct, the potential at the plate of tube 53 falls rapidly, and by virtue of the coupling through capacitor 55, the grid potential of tube 51 is lowered to such a degree that cutoff takes place in tube 51. Once again, it may be pointed out that the effect which has taken place depends on operation of inductor 60 in such a way as to take advantage of the steep, or high-inductance, portion of the curve of Figure 4. In order to take advantage of the full delay possibilities inherent in this characteristic (I prefer to operate the inductor, as has been described, between saturation in one direction and saturation in the other direction. Thus, in order to derive the full advantages of a saturable reactor in the circuit, it is necessary to have a reversal of current therein, as described. However, I should like to point out that some benefit may be derived from operation from a condition of substantially zero current in the reactor to a condition of saturation in either chosen direction. Such operation would result if the magnitudes of $E_1$ and $E_2$ were made substantially equal.

Figure 9:
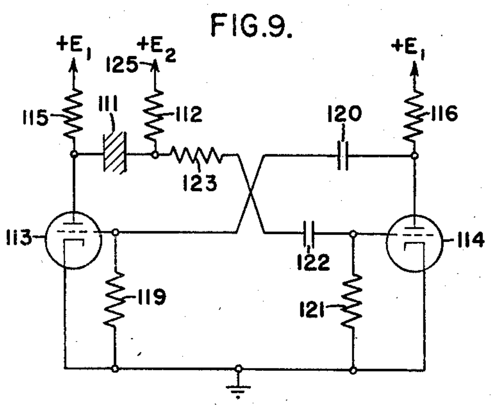
Figure 9 is a schematic circuit diagram of another configuration of my invention somewhat similar to that of Figure 6 but in which non-linear capacitance rather than non-linear inductance is employed.
Figures 10, 11:
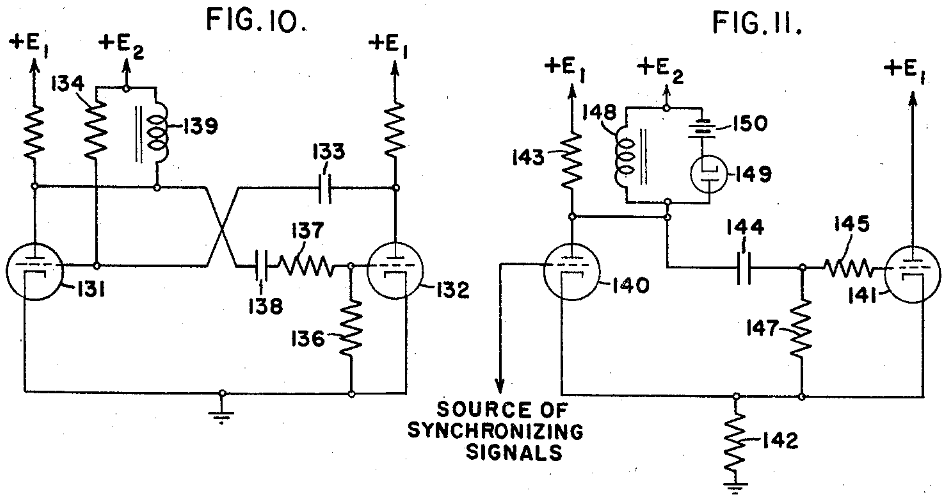
Figure 10 is a schematic circuit diagram of a slightly different configuration incorporating my invention.
Figure 11 is a schematic circuit diagram of still another configuration illustrating my invention in which cathode coupling between the tubes is employed.

It will be noted that a saturable reactor is included in the delay circuit of only one tube, in the configuration of Figure 6. Such a configuration is satisfactory if it is desired to have one conduction state of the circuit last a comparatively long time while the other conduction state of the circuit lasts a comparatively short time. If, on the other hand, it is desired that both conduction states have a comparatively long duration, then the delay-determining circuits of both tubes should have some non-linear means associated with them as, for instance, in the embodiment of Figure 7. It should be borne in mind that the same considerations apply to some of the remaining circuit embodiments incorporating my invention which will be described in the following paragraphs. While the embodiments of Figures 9 and 10 are illustrated as having the non-linear means associated with only one tube, it will be understood that, if a symmetrical characteristic with comparatively long, jitter-free delay in both half-cycles is required, there should be non-linear means associated with the timing of both tubes.

Figure 7:
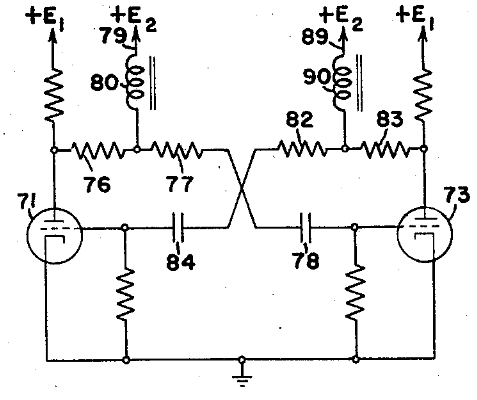
Figure 7 is a schematic circuit diagram of a configuration illustrating my invention which is a variation on that of Figure 6.

In particular, the configuration of Figure 7 includes, in addition to the conventional multivibrator circuit elements of Figure 1, a pair of resistors 76 and 77 connected in series between the plate of a tube 71 and a coupling capacitor 78. Further, a saturable reactor 80 is connected between the junction of resistors 76 and 77 and a source 79 of voltage $E_2$, smaller in magnitude than the tube plate-supply voltage. Similarly, the configuration of Figure 7 also includes a pair of resistors 82 and 83 connected in series between the plate of a tube 73 and a coupling capacitor 84. A saturable reactor 90 is connected between the junction of resistors 82 and 83 and a source 89 of voltage $E_2$, smaller in magnitude than the tube plate-supply voltage. Once again, it will be understood that voltage supplies are represented in a conventional manner and that the negative terminals of all voltage supplies are connected in some manner to ground or to the cathodes of the tubes. Figure 7 shows clearly how the circuitry of the configuration of Figure 6 can easily be made symmetrical in order to permit both conduction states of the relaxation oscillator to be relatively long in duration and, at the same time, to be free of jitter in switching. This demonstration will be understood to be exemplary of similar extensions which may be made for a similar purpose in the cases of the embodiments of Figures 9 and 10.

Figure 8:
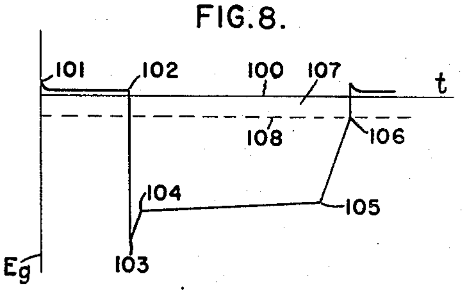
Figure 8 is a sample plot of grid voltage as a function of time in a relaxation oscillator of the type shown in Figure 6.

Turning to Figure 8, a curve is presented which represents the grid voltage of a tube in one of the relaxation oscillators according to my invention. If zero grid voltage of one tube is represented by an axis 100, the grid voltage during conduction of the tube is very close to zero and may be represented by the portion of the curve from point 101 to point 102. At point 102, the grid voltage of the tube under consideration drops sharply to point 103 when conduction in the other tube begins, at which time the potential at the plate of the other tube drops sharply and, through a coupling capacitor, drives the potential at the grid of the tube under consideration far below the cutoff level. At point 103, the grid voltage begins to rise at a relatively rapid rate because the non-linear reactor, being at that time saturated, presents a relatively small obstacle to the changing discharge current of the coupling capacitor. When the grid voltage reaches point 104, however, the magnitude of the current flowing in the reactor has decreased to such an extent that desaturation of the reactor takes place, and the inductance thereof suddenly increases, making the reactor a serious obstacle to the change of discharge current therein. For this reason, the charge on the coupling capacitor can dissipate only very slowly as long as the reactor is desaturated, and therefore, the rate of increase of potential on the tube grid is very slow from point 104 to point 105, thus permitting a comparatively long delay before the next switching takes place. As has been pointed out in connection with the discussion of Figure 4, the current in the saturable reactor decreases to zero, permitting the reactor to desaturate, but must in addition rise to a considerable magnitude in the opposite direction before the reactor again saturates. This resaturation takes place at point 105 of the curve of Figure 8, whereupon the inductance of the reactor falls off rapidly, and the discharge of the coupling capacitor can sharply increase, thereby permitting the potential at the tube grid to rise sharply. The sharp rise continues from point 105 to point 106, at which point the curve of tube grid voltage intersects the level of cutoff voltage for the tube. Conduction of the tube begins, and, in a manner which is familiar to all who are skilled in the art, produces a regenerative switching action. Thus, as has been described, the tube which was cut off assumes a state of conduction, and the formerly conducting tube becomes cut off. It will be seen that such a switching process is the essence of relaxation-oscillator operation, and that a similar switching operation in the reverse direction will complete a full cycle of oscillator operation. If the non-linear element is included in the timing circuit of both tubes, then both parts of the cycle may be relatively long in duration, and at the same time free of jitter. If it is not necessary for both parts of the cycle to be relatively long in duration, then the non-linear element may be left out of the timing circuit of one tube.

To re-emphasize the novel operation of the relaxation oscillators of my invention, it may be pointed out once again that the reactor is such as to permit only a slow rise of potential at the grid of the non-conducting tube during most of the period when that tube is non-conducting, but that the reactor changes its reactance at a point in time just before switching is desired. Thereafter, the grid voltage of the non-conducting tube is permitted to rise sharply until conduction begins. The slope of this rise of grid potential can be made almost independent of the length of total period. For example, with a circuit according to my invention, I have been able to achieve a slope of the grid potential which is numerically equal to 8 volts per microsecond at the time of switching, following a fifty-microsecond delay. These results were obtained with only a 250-volt supply. Now, if comparable grid-voltage-slope performance were sought by means of the prior-art circuit of Figure 2, it would be necessary to have a 500-volt variation of plate voltage of the tubes, which is obviously impracticable for safe operation of most switching tubes. Moreover, in order to fulfill the slope objective for the grid voltage, the grid-leak resistor would have to be returned to a thousand-volt supply.

The foregoing discussion of the embodiment of Figure 6 and Figure 7 has pointed out that, when a saturable inductor is used in the timing circuit of the cutoff tube, best results can be obtained if reversal of current in the inductor is obtained. Turning to the embodiment of Figure 9, it will now be explained how comparable results may be obtained by use of a non-linear capacitor in the timing circuit if provision is made for reversal of the polarity of the charge on the capacitor. In the embodiment of Figure 9, a non-linear capacitor which should have characteristics of the form of Figure 5 is employed. Such a capacitor may employ, for instance, barium titanate as a dielectric material. Such a material can have a characteristic in the charge-voltage plane or the displacement-electric-gradient plane which is similar in form to the B—H characteristic of some of the ferrite materials. In the embodiment of Figure 9, the non-linear capacitor 111 appears in a position analogous to that of resistor 56 in the embodiment of Figure 6. Moreover, in the embodiment of Figure 9 there appears a resistor 112 in a position analogous to that of saturable reactor 60 in the embodiment of Figure 6. Otherwise, the embodiment of Figure 9 is similar to that of Figure 6. Specifically, the embodiment of Figure 9 contains a pair of tubes 113 and 114 having respective plate resistors 115 and 116 connected to similar plate voltage supplies of voltage $E_1$. The grid of tube 113 has associated with it a grid-leak resistor 119 connected to ground, and a coupling capacitor 120 connected to the plate of tube 114. The grid of tube 114 has associated with it a grid-leak resistor 121 connected to ground, and a coupling capacitor 122, the latter being connected to a resistor 123 which is in turn connected to the junction between non-linear capacitor 111 and resistor 112. Resistor 112 is, as was the case with saturable reactor 60 in the configuration of Figure 6, returned to a source of voltage $E_2$ which may be designated by the numeral 125 and which should be smaller in magnitude than the plate voltage source of magnitude $E_1$.

As for the operation of the circuit configuration of Figure 9, it may be restated at this point that optimum performance of the circuit depends on reversal of the polarity of the charge on non-linear capacitor 111, just as optimum performance of the circuit of Figure 6 depends upon reversal of the flow of current in saturable reactor 60. While tube 113 in the configuration of Figure 9 is in its cutoff state, the plate thereof will have substantially reached the potential $E_1$, and the left-hand plate of capacitor 111 will be positive with respect to the right-hand plate by an amount $(E_1—E_2)$ which is sufficient to bring the capacitor substantially to point 45 on the operation characteristic of Figure 5. When tube 113 begins to conduct and its plate potential falls sharply to a level below $E_2$, capacitor 111 begins to discharge rapidly with an apparent time constant which is relatively small. The relatively small time constant may be attributed to a relatively small apparent initial capacitance, as evidenced by the fact that the slope of the curve of Figure 5 between points 41 and 45 is relatively small. Since the slope of the curve at any given point is a measure of the differential ratio of charge to voltage, or differential value of capacitance of the capacitor at that point, it will be seen that the apparent capacitance of capacitor 111 remains relatively small until the capacitor has substantially no voltage across it. However, at point 41, when the voltage begins to build up in the opposite direction, the differential or apparent capacitance becomes relatively large, as a result of which the time constant of the circuit becomes relatively large. This fact is, of course, what permits the long delay before the next switching of the tubes.

Since the potential of the plate of tube 113 is, during conduction, at a lower value than $E_2$, capacitor 111 will have a tendency to charge up so that its right-hand electrode (as it appears in Figure 9) will be positive with respect to its left-hand electrode. In fact, the potential difference between $E_2$ and the plate of tube 113 during conduction of the tube is such that capacitor 111 reaches point 44 on the curve of Figure 5, at which time the apparent or differential capacitance suddenly becomes relatively small, thus making the time constant of the timing circuit relatively small also. When that change of time constant takes place, the potential at the junction between capacitor 111 and resistor 112 can rise relatively rapidly. Moreover, the discharge of capacitor 122 can then take place at an accelerated rate. The net result of these two effects is a relatively rapid rise of potential at the grid of tube 114, which takes place until that grid potential reaches the point where conduction of tube 114 can begin. When conduction begins in tube 114, the plate potential of that tube falls rapidly, an effect which is coupled through capacitor 120 substantially to cut off conduction in tube 113, in a manner which is well known. Thus a change of state has taken place after a relatively long delay, and the curve of grid potential of tube 114 is shaped in such a way as to intersect the cut-off voltage level at an angle sufficiently close to a right angle to avoid jitter in the switching. The delay in the second part of the cycle of operation of the embodiment of Figure 9 is smaller than in the first part of the cycle because, as the circuit diagram is drawn, there is a non-linear element in the timing circuit of only one tube. However, as was pointed out in connection with the discussion of Figure 6 and Figure 7, the operation may be made symmetrical, with comparatively long delays in both parts of the cycle, by modifying the timing circuit of tube 113 to make it like that of tube 114. That is to say, a non-linear capacitor and a resistor may be connected between capacitor 120 and the plate of tube 114, and a resistor may be connected to a voltage source $E_2$ from the junction between that capacitor and that resistor.

A modification of the circuit of Figure 6 is shown in Figure 10. In the embodiment of Figure 10, the general outlines of the circuit are similar to those of the embodiment of Figure 6, but the one of the two tubes which does not have non-linear means associated with its timing circuit has instead a grid resistor which is returned to a positive voltage instead of to ground. Thus, while one part of the cycle of operation has the benefit of non-linear means to produce a comparatively long delay and avoidance of jitter, the other part of the cycle depends on the grid-leak resistor returned to a positive voltage in order to avoid jitter. To describe the circuit more specifically, it may be pointed out that the circuit includes two tubes 131 and 132 with conventional plate resistors connected to a supply of plate voltage. The timing circuit of tube 131 includes a capacitor 133 connected between the grid of tube 131 and the plate of tube 132, and a grid-leak resistor 134 connected between the grid of tube 131 and a source of positive voltage $E_2$. The timing circuit of tube 132, on the other hand, includes a grid-leak resistor 136 connected between the grid and ground, and a resistor 137 and capacitor 138 connected in series-circuit relationship between the grid of tube 132 and the plate of tube 131. It includes, further, a saturable reactor 139 connected between the plate of tube 131 and the source of positive voltage $E_2$. This type of circuit configuration is quite satisfactory for services in which jitter is to be avoided but in which only one part of the cycle need be relatively long in duration. Naturally, if only one part of the cycle need be relatively long, it is good design to utilize only one saturable reactor because reactors are likely to be more expensive than some other circuit components. If so desired, in order to save expense or for some other reason, the saturable reactor in all the circuit configurations may be reset to its original saturated condition by means of a signal coupled thereinto from another coil, instead of connecting the reactor to a separate source of voltage $E_2$. As previously stated, if desired, the reset may be made partial so as to bring the core to a state of substantial demagnetization rather than all the way back to saturation in a direction opposite to the direction in which the core is saturated when the switching is complete.

In Figure 11 is shown an embodiment of my invention in which cathode coupling between the tubes is employed in order to have the grid of one tube free for synchronization or excitation by an external signal. Two tubes 140 and 141 are employed, as in the other circuit configurations, but their cathodes, instead of being joined together and directly grounded, are joined together and connected to one end of a resistor 142 the other end of which is grounded. Thus, the potential level of the two cathodes can vary sufficiently to convey a switching signal from tube 141 to tube 140. Tube 140 has a conventional plate load resistor returned to a source of plate supply voltage $E_1$. The plate of tube 140 is also connected to one end of the series combination of a capacitor 144 and a resistor 145, the other end of the series combination being connected to the grid of tube 141. The junction between capacitor 144 and resistor 145 is connected through a grid-leak resistor 147 to the cathodes of the tubes. The plate of tube 140 is still further connected to one terminal of a saturable reactor 148 which has its other terminal connected to a source of voltage $E_2$, where $E_2$ is less than the plate supply voltage $E_1$. Connected in parallel with saturable reactor 148 is the series combination of a diode 149 and a source 150 of bias voltage, which may be a dry battery or any other suitable source. The diode 149 is poled so that its anode is connected directly to the plate of tube 140, and the voltage source 150 is poled so that its positive terminal is connected to the cathode of diode 149. It will be seen that the network comprising circuit elements 144 through 150 is the timing circuit which controls the beginning of conduction in tube 141, while the signal which initiates conduction in tube 140 is communicated to tube 140 through the direct connection between the cathodes of tubes 140 and 141. This arrangement leaves the grid of tube 140 free for the injection of synchronizing signals to govern the frequency of oscillation in a manner well known in the art.

It will be seen that the arrangement of the saturable reactor circuit in the configuration of Figure 11 is such that, as long as tube 140 is non-conducting, current can flow from resistor 143 through saturable reactor 148 to the source of voltage $E_2$. In the "steady state," since there will be substantially no rate of change of current in reactor 148, there will be substantially no voltage across the series combination of diode 149 and bias voltage supply 150, and no current flowing therein. Likewise, when tube 140 begins to conduct, thus bringing the potential of its plate below the level $E_2$, the polarity of diode 149 prevents any flow of current through it and through bias supply 150. However, when conduction in tube 140 stops, thereby raising the plate potential to a level higher than $E_2$, the magnitude of the voltage which can appear across reactor 148 as the current therein tends to reverse is limited to the voltage of the bias supply 150. Thus, a plot of the potential at the plate of tube 140 has a flat top and remains substantially level until the direction of the current in reactor 148 has substantially completed its reversal, at which time conduction through the diode ends, and the potential at the plate of tube 140 falls sharply. This sharp fall is coupled through capacitor 144 and resistor 145 to lower the grid voltage of tube 141, thereby lowering conduction in tube 141 and in resistor 142. When conduction in resistor 142 falls sharply, the potential at the cathode of tube 140 falls sharply to such an extent that conduction can begin again in tube 140. It will be seen that diode 149 and bias supply 150, by changing or limiting the voltage which can appear across reactor 148 in one direction, prolong the time required for reactor 148 to traverse the curve of Figure 4 from a state of saturation in one direction to a state of saturation in the other direction. Thus, this part of the cycle of oscillation is greatly prolonged because the reactor requires a certain minimum volt-time integral across it in order to traverse the curve from saturation in one direction to saturation in the other. That is to say, since a certain value of $\int e dt$ is required in order to force any given saturable reactor from saturation in one sense to saturation in the opposite sense, I am able, by limiting the magnitude of "$e$" to a small value, to cause the time required for the excursion along the curve to be comparatively long. Thus, I have provided a comparatively long delay between the switching-off of tube 140 and the switching-on again of that tube. Moreover, I have provided for the switching-on again of tube 140 to be free of jitter because, when the voltage across saturable reactor 148 falls off at the end of its current reversal, it does so very rapidly as saturation of reactor 148 in the new direction is accomplished. As previously explained, the sharp fall of voltage across reactor 148 manifests itself as a sharp fall of potential at the grid of tube 141, and a sharp fall of voltage across resistor 142 and of potential at the cathode of tube 140. This feature satisfies a principal object of my invention, specifically, to provide crisp switching after a relatively long delay. This object has been achieved while at the same time leaving the grid of tube 140 free to receive synchronizing signals or any other excitation which one may desire to apply to it.

By way of illustration of the embodiment of my invention displayed in Figure 11, representative magnitudes of certain circuit parameters may be informative. It will be understood that the magnitudes of these parameters are not to be taken as the only suitable ones but merely as typical values which have been found.

To cause the relaxation oscillator of Figure 11 to have a free-running period in the neighborhood of 60 microseconds. Furthermore, these values were chosen in such a way that tube 141 conducts during approximately 50 of those 60 microseconds, while tube 140 enjoys substantial conduction during only approximately 10 of those 60 microseconds. The values of the circuit elements in this embodiment may be taken an indicative of the order of magnitude of the values of analogously located circuit elements in the other embodiments of my invention. However, it will be understood that determination of the exact values of the circuit elements is simply a design problem which is to be solved in a straightforward manner when the desired operating characteristics have been decided upon. Principles of such design procedures are familiar to those who are skilled in the relaxation-oscillator art. Suggested values of circuit elements in Figure 11 are as follows:

| | |
|---|---|
| Tube 140 | 6AG7 (triode-connected). |
| Tube 141 | 12BH7. |
| Resistor 142 | 500 ohms. |
| Resistor 143 | 15,000 ohms. |
| Capacitor 144 | 100 micro-microfarads. |
| Resistor 145 | 100,000 ohms. |
| Resistor 147 | 75,000 ohms. |
| Inductor 148 | 10 cores of General Ceramics S–1 material (part No. F262), each wound with 200 turns of wire and all connected in series. Core cross section .0125 sq. in. Mean magnetic path 1 in. |

$$E_1 = 500 \text{ volts}$$
$$E_2 = 360 \text{ volts}$$

Figure 12:
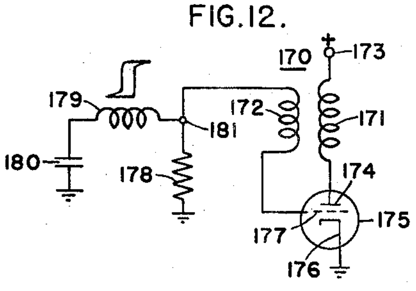
Figure 12 is a schematic illustration of the application of the principles of the invention to a blocking oscillator.

The blocking oscillator network shown in Figure 12 incorporates the usual transformer 170, having a tightly-coupled primary winding 171 and secondary winding 172. One terminal of the primary winding 171 may be connected at 173 to a suitable source of anode potential, while the other terminal of winding 171 is connected with the anode 174 of a conventional electron discharge device or valve 175 having a cathode 176 connected with ground.

The control electrode 177 of the valve 175 is connected with the end of winding 172 poled inversely to the anode end of the primary winding 171. The other end of winding 172 may be connected with ground through a resistance 178. A non-linear inductance 179 of the type previously described is connected at one end with the ungrounded lead of resistance 178, and the other end of inductance 179 may be connected with ground through a capacitor 180. The winding of inductance 179 is disposed on a core which may have a predominately rectangular B—H characteristic.

In analyzing the operation of the network of Figure 12, it is convenient to assume that the control grid of electrode 177 is initially highly negative to render the valve 175 substantially non-conductive. As the potential across the resistance 178 gradually decays, a point is reached where conduction in the valve 175 is initiated. This current flow causes the grid 177 to change potential positively, further accentuating the increase in anode current, to drive the grid 177 still more positive until the loading due to grid current is sufficient to reduce the loop gain through the valve 175 and transformer 170 to unity. The flow of grid current develops a potential across resistance 178. The magnitude of the resistance 178 is selected in conjunction with the transient impedance of the inductor 179 so that this flow of grid current does not produce a potential sufficient to immediately block or interrupt the flow of current through the valve 175. The potential across the resistance 178 causes an increase in current and gradual flux build-up in the core of inductance 179 until the core is driven to the knee on the B—H characteristic, when the impedance of inductance 179 diminishes sharply, permitting the capacitor 180 to charge rapidly to a potential cutting off the valve 175. The network is now in a condition with the capacitor 180 charged negatively and no current flowing in the valve 175. The capacitor 180 discharges slowly through inductance 179 and resistance 178 until $\int edt$ applied across the inductance 179 has driven the core back to the other saturation knee on the B—H characteristic, when the inductance of winding 179 decreases sharply, permitting the capacitance 180 to discharge rapidly through the resistance 178 and prepares the network for initiation of the next operating cycle. An advantage of this network is the absence of any requirement for auxiliary core resetting circuits, this function being performed by the reverse current flow from the timing capacitor 180 through the inductance 179 and timing resistance 178.

The specific embodiments which have been shown and discussed in the paragraphs supra were chosen to illustrate the principles of my invention. As is well known to those skilled in the art, the array, disposition, number, and character of the elements may be varied to meet particular operating or environmental requirements without departing from the essence of the invention.

What I claim as new and desire to secure by Letters Patent of the United States is:

1. In a wave generating network first and second electric valves in circuit relationship with a supply of electromotive force, a capacitor connected between an input electrode of said first one of said valves and an output electrode of said second valve, a resistor connected between said input electrode of said first valve and a common electrode of said first valve, a resistor connected between an input electrode of said second valve and a common electrode of said second valve, a series connected combination of a capacitor and first and second timing resistors, said capacitor being directly connected to said input electrode of said second valve and said second timing resistor being directly connected to an output electrode of said first valve, and a saturable inductor connected between a source of potential and the junction between said first and second timing resistors.

2. In a wave generating network, first and second electric valves, an impedance connecting an output electrode of said first valve with a first source of electric energy, an impedance connecting an output electrode of said second valve with a source of electric energy, an impedance connected across the input to said first valve, an impedance connected across the input to said second valve, a first capacitor connecting an output electrode of said second electric valve to an input electrode of said first electric valve, a second capacitor having one electrode connected with an input electrode of said second electric valve, first and second resistances serially connected between a second electrode of said second capacitor and an output electrode of said first electric valve, and a saturable reactor connected between the junction of said first and second resistances and a second source of electric energy characterized by a potential less than the potential of said first source.

3. In a wave generating network first and second valves each having output, input and common electrodes in circuit relationship with a supply of electromotive force, a capacitor connected between a control electrode of said first valve and an output electrode of said second valve, a resistance connected between said control electrode of said first valve and the common electrode of said first valve, a resistance connected between the control electrode of said second valve and the common electrode of said second valve, a series connected combination of a capacitor, a timing resistor and a non-linear capacitor, said first-named capacitor being operatively connected to said control electrode of said second valve and said non-linear capacitor being operatively connected to an output electrode of said first valve, and a further resistance connected between a source of electromotive force and the junction of said timing resistor and said non-linear capacitor.

4. A wave generating network comprising, in combination, a pair of electric valves each having cathode, control and anode electrodes in circuit relationship with a source of electromotive force and each of which has connected to its control electrode a timing circuit, said timing circuit including a resistance connected between each of said cathode and control electrodes, and a series combination of a capacitor, a third resistance and a non-linear capacitor, means connecting said first-named capacitor to a control electrode of one of said pair of valves, means connecting said non-linear capacitor to the anode of the other one of said pair of valves, and a fourth resistance connected between a source of electromotive force and the junction of said third resistance and said non-linear capacitor.

5. In combination first and second electric valves in circuit relationship with a supply of electromotive force, each of said valves having common, control and output electrodes, a capacitor connected between a control electrode of said first valve and an output electrode of said second valve, a resistance connected between said control electrode of said first valve and a source of electromotive force, a series connected combination of a resistance and timing capacitor connected between a control electrode of said second valve and an output electrode of said first valve, a resistance connected between said control electrode of said second valve and the common electrode of said second valve, and a saturable reactor connected between a source of electromotive force and said output electrode of said first valve.

6. A cathode-coupled relaxation oscillator comprising at least two electric valves with control, cathode and anode electrodes in circuit relationship with a supply of electromotive force and having their cathodes coupled together through a common load resistance, a series connected resistance and capacitor, means connecting said series resistance to a control electrode of one of said valves, means connecting said capacitor to an anode of the other of said valves, a resistance connected between said cathodes and the junction of said series connected resistance and capacitor, a saturable reactor connected between said anode of said other one of said valves and a source of electromotive force, and the series combination of a non-symmetrically conductive device and a source of bias potential connected in parallel-circuit relationship with said saturable reactor, said non-symmetrically conductive device being poled to favor the flow of current in a direction from said anode of said other one of said valves into said last-named series combination, and said source of bias potential being poled to oppose flow of current in said direction.

7. A relaxation oscillator comprising an active electric device having an input and an output, a regenerative feedback path coupling said output to said input for causing said device to oscillate between two states of conduction, a resistor-capacitor timing network governing the time duration of at least one of said states, means coupling said timing network to said input for control of the state of said active device and to said feedback circuit for providing recurrent charging of the capacitor of said resistor-capacitor network, a discharging circuit for said capacitor comprising a saturable reactive device non-linearly responsive to the capacitor discharging circuit condition for controlling the rate of dissipation of the charge on said capacitor.

8. A relaxation oscillator comprising an active electric device having an input and an output, a regenerative feedback path coupling said output to said input for causing said device to oscillate between two states of conduction, a resistor-capacitor timing network governing the time duration of at least one of said states, means coupling said timing network to said input for control of the state of said active device and to said feedback circuit for providing recurrent charging of the capacitor of said resistor-capacitor network, a discharging circuit for said capacitor comprising a saturable inductor non-linearly responsive to current in the capacitor discharging circuit for controlling the rate of dissipation of the charge on said capacitor.

9. A relaxation oscillator comprising an active electric device having an input and an output, a regenerative feedback path coupling said output to said input for causing said device to oscillate between two states of conduction, a resistor-capacitor timing network governing the time duration of at least one of said states, means coupling said timing network to said input for control of the state of said active device and to said feedback circuit for providing recurrent charging of the capacitor of said resistor-capacitor network, and a discharging path for said capacitor including a saturable inductor connected in series with said capacitor, non-linearly responsive to the discharge current of said capacitor.

10. A relaxation oscillator comprising a pair of active electric devices, means mutually regeneratively coupling said devices together for oscillation between two states of conduction wherein high conduction of one device causes said other device to assume a state of low conduction and vice versa, a resistor-capacitor timing network governing the time duration of at least one of said states of said one device, means coupling said timing network to an input of said one device for control of the state thereof and to said regenerative coupling means for providing recurrent charging of the capacitor of said resistor-capacitor network, a discharging circuit for said capacitor comprising a saturable reactive device non-linearly responsive to the capacitor discharging circuit condition for controlling the rate of dissipation of the charge on said capacitor.

11. A relaxation oscillator comprising a pair of active electric devices, means mutually regeneratively coupling said devices together for oscillation between two states of conduction wherein high conduction of one device causes said other device to assume a state of low conduction and vice versa, a resistor-capacitor timing network for governing the time duration of at least one of said states of said one device, means coupling said timing network to an input of said one device for control of the state thereof and to said regenerative coupling means for providing recurrent charging of the capacitor of said resistor-capacitor network, a discharging circuit for said capacitor comprising a saturable inductor non-linearly responsive to current in the capacitor discharging circuit for controlling the rate of dissipation of the charge on said capacitor.

12. A relaxation oscillator comprising a pair of active electric devices, means mutually regeneratively coupling said devices together for oscillation between two states of conduction wherein high conduction of one device causes said other device to assume a state of low conduction and vice versa, a resistor-capacitor timing network governing the time duration of at least one of said states of said one device, means coupling said timing network to an input of said one device for control of the state thereof and to said regenerative coupling means for providing recurrent charging of the capacitor of said resistor-capacitor network, a discharging circuit for said capacitor comprising a saturable capacitor non-linearly responsive to voltage in the capacitor discharging circuit for controlling the rate of dissipation of the charge on said capacitor.

13. A relaxation oscillator as set forth in claim 7 wherein said saturable reactive device is a capacitor non-linearly responsive to voltage in the capacitor discharging circuit.

References Cited in the file of this patent

UNITED STATES PATENTS

| | | |
|---|---|---|
| 2,426,205 | Grieg et al. | Aug. 26, 1947 |
| 2,485,395 | Lord | Oct. 18, 1949 |
| 2,560,576 | Hoeppner | July 17, 1951 |
| 2,610,298 | Zaloudek | Sept. 9, 1952 |
| 2,639,385 | Augustadt | May 19, 1953 |
| 2,701,311 | Gray | Feb. 1, 1955 |
| 2,722,602 | Pawley | Nov. 1, 1955 |
| 2,735,009 | Harry | Feb. 14, 1956 |
| 2,759,181 | Wrenn | Aug. 14, 1956 |
| 2,772,357 | Wang | Nov. 27, 1956 |

FOREIGN PATENTS

| | | |
|---|---|---|
| 575,395 | Great Britain | Feb. 1, 1946 |